Feb. 5, 1957
J. L. HOLDAWAY ET AL
2,779,973
METHOD AND APPARATUS FOR FORMING CONTINUOUS
STRIPS OF SHEET MATERIAL FROM TUBING
Filed Dec. 24, 1952
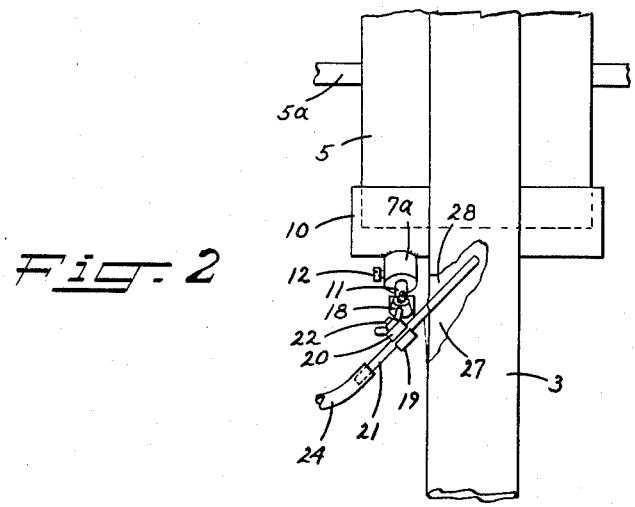
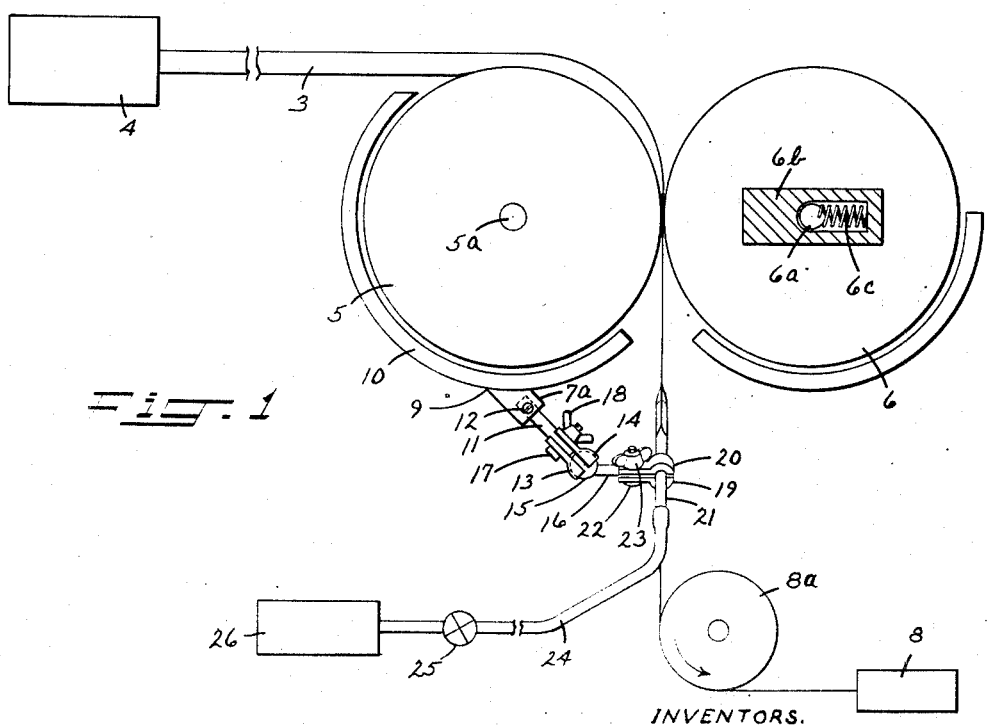
INVENTORS.
JAMES L. HOLDAWAY
SEDDON C. NELSON
BY Thomas R. O'Malley
ATTORNEY.

United States Patent Office 2,779,973
Patented Feb. 5, 1957

2,779,973

METHOD AND APPARATUS FOR FORMING CONTINUOUS STRIPS OF SHEET MATERIAL FROM TUBING

James L. Holdaway and Seddon C. Nelson, Fredericksburg, Va., assignors to American Viscose Corporation, Philadelphia, Pa., a corporation of Delaware Application December 24, 1952, Serial No. 327,808

4 Claims. (Cl. 18—47.5)

The present invention relates to the manufacture of non-fibrous films, sheets, pellicles and the like. More particularly it relates to novel and improved methods and apparatus for producing films, sheets, pellicles and the like from a continuously advancing non-fibrous tubular product.

In the manufacture of various types of nonfibrous sheet materials and the like, the use of conventional extrusion apparatus having elongated linear extrusion orifices is found particularly impractical for some purposes due to the inherent tendency of such apparatus to cause undesirable thickening of the marginal portions of the extruded sheet. Thus, for example, in the manufacture of continuous lengths of relatively narrow strips of regenerated cellulose tape or the like where the thickened beads are necessarily removed to provide the tape with regular and uniform edges, the resultant wastage materially reduces the efficiency of the process. In the past in order to reduce this waste, it has been customary to manufacture relatively narrow strips of sheet material and the like by forming a tubular product of suitable size and subsequently cutting or slitting its side wall in one or more places. Though many types of stationary and rotary slitting devices such as knives and the like have been devised heretofore, considerable difficulty has been experienced in preventing the occurrence of jagged and irregular cuts and breaks in the slitted sheet or film.

It is a principal object of the present invention to provide novel and improved methods and apparatus for the manufacture of relatively narrow sheets and strips of non-fibrous material.

It is a further object of the present invention to provide unique methods and apparatus for slitting one or both of the edge portions of a tubular product in a novel and improved manner such that jaggedness, unevenness and non-uniformity are minimized.

Other objects and advantages of the invention will be apparent from the following description. In the drawing which is illustrative of the invention, Figure 1 is a partly diagrammatic elevational view of a preferred embodiment of the present invention; and Figure 2 is a fragmentary detail showing the side elevation of the running tube and slitting tool seen in Figure 1.

In general the improved procedure for manufacturing a continuous strip of a relatively narrow sheet material in accordance with the present invention includes continuously forming a tubular product, flattening the tubular product in any suitable manner, and slitting the tubular product along a creased portion thereof with a suitable blunt instrument. It has been found that the edge portions of the sheet material may be formed with a minimum of irregularity in such a manner.

Structural details of a preferred embodiment of the apparatus which is employed in the present invention are shown in the accompanying figures of the drawing. As illustrated therein the tubular material or product 3 is formed by any suitable conventional extrusion apparatus such as that which is generally designated in the drawing by the reference character 4 and is conducted between the nip rolls or the like 5 and 6 which are mounted on their associated shafts 5a and 6a, past the slitting device about the guide roll 8a and on to any suitable take-up device or subsequent processing station which is generally designated in the drawing by the reference character 8. As shown, the shaft 6a and the nip roll 6 mounted thereon are preferably mounted in the suitably slotted member 6b and are biased toward the other nip roll 5 in any conventional manner such as by the spring member 6c.

Though the pair of rolls 5 and 6 is shown in the drawing, it is to be understood that the tubular material 3 could be flattened in any other conventional manner such as by eliminating the roll 6 and merely passing the tubular material about a portion of the periphery of roll 5 without departing from the spirit or scope of the present invention.

The boss 7a, which is preferably secured in any suitable manner such as by welding at 9 to the lower periphery of the guide roll shroud 10, provides a means for positioning the slitting device properly with respect to the continuously downwardly advancing flattened tubular product 3. Accordingly one extremity of the rod 11 is secured in the apertured portion of the boss 7a by any suitable means such as the set screw 12 shown on the drawing and the rod extends downwardly and angularly therefrom. The opposite extremity of the rod 11 is preferably fashioned as shown to form the curvilinear clamp member 13 which together with the complementary clamp member 14 is adapted to engage the enlarged spherical end 15 of the arm 16 and thereby provide a universal joint or connection thereat. The bolt 17 and the wing nut 18 which cooperate with the clamping members 13 and 14 provide a means for loosening and tightening the same about the spherical extremity of the arm 16 in any desired position. The other end of the arm 16 is also preferably similarly fashioned to form the curvilinear member 19 which together with the complementary clamp member 20 is adapted to engage the periphery of the cylindrical tubular rod or the like 21. The bolt 22 and the wing nut 23 which cooperate with the clamping members 19 and 20 provide a means for loosening and tightening the same about the periphery of the rod 21.

As will be more apparent hereinafter, one extremity of the tubular rod 21 is adapted to engage the continuously downwardly advancing flattened tube 3 while its opposite extremity is connected as shown preferably by means of the flexible conduit or the like 24 through the control valve 25 to any suitable fluid source such as the reservoir or the like 26.

In carrying out the improved sheet forming operation in accordance with the present invention the tubular product 3 after being formed by the conventional extrusion apparatus 4 is conducted through any suitable number of preliminary processing stations not shown on the drawing before it is flattened as it is guided about a portion of the periphery of the nip roll 5 and creased between the nip rolls 5 and 6. It is to be understood, however, that the tubular product could be flattened and creased at any suitable point in the processing operation and that therefore the particular position of the nip rolls 5 and 6 in the drawing is not intended to limit the scope of the present invention in any way. The blunt extremity of the tubular rod 21 is then thrust preferably through one of the side walls of the flattened tube adjacent one of the creases formed therein. Thereafter the continuously advancing slitted tubular product 3 is preferably directed about the guide roll 8a and on toward any suitable and convenient take-up device or subsequent processing station 8.

It is to be understood that though the extremity of the rod 21 is preferably thrust through but one of the creased side walls of the flattened tube, it could be passed through both of the same without departing from the spirit or scope of the present invention. Moreover, it is to be similarly understood that the use of a pair of suitably positioned slitting rods rather than one of the same is within the purview of the present invention.

The various bolt and wing nut adjustments associated with the supporting means for the arm 16 and the tubular rod 21 are adapted to rigidly position the same in any manner with respect to the downwardly moving flattened tube that may be desired. Preferably the rod 21 is positioned as shown such that its longitudinal axis lies in the plane of the flattened tube and extends upwardly to meet the tube at an acute angle with its freshly slit edge or edges.

It has been found that by continuously passing the creased and perhaps slightly weakened portion of the tubular product around the smooth rounded surface of the tubular rod 21, a more regular and even slitted edge may be obtained. Moreover it has been found that the slitting operation may be performed still more accurately, smoothly, and evenly when the tubular product is kept continuously wet or moist adjacent the point of separation of the sides of the flattened tube. Accordingly a predetermined quantity of a suitable liquid such as water or the like is preferably supplied from the reservoir 26 through the control valve 25, the flexible conduit 24, and the open extremity of the tubular rod 21 to the interior of the tubular product. Since the flattened sides of the tubular product cohere readily and form an effective seal, the water or the like tends to collect in a relatively small pocket 28 between the sides of the tubular product and is thereafter discharged at 27.

Though not shown on the drawing the liquid from the reservoir 26 could be supplied adjacent the point at which the lateral surfaces of the flattened tube pass about the tubular rod 21 through apertures along the lateral periphery thereof or in any other suitable manner without departing from the spirit and scope of the present invention.

While preferred embodiments of the invention have been disclosed, the description is intended to be illustrative only and it is to be understood that changes and variations may be made without departing from the spirit and scope of the invention as defined by the appended claims.

We claim:

1. A method of manufacturing a continuous strip of sheet material comprising continuously forming a tubular product of a film-forming material, flattening the tubular product, slitting the flattened tubular product along an edge thereof by passing the flattened faces over opposite sides of a blunt instrument projecting through said edge between said faces, and maintaining the area of the tubular product which is being slit moist.

2. Apparatus for continuously slitting a running length of sheet material comprising means for forming a longitudinal crease in said running length, a relatively blunt slitting element positioned in line with said crease and around which the material is drawn to slit the material along the crease, said slitting element being hollow, means for introducing moistening liquid through the bore of said element, and means for so drawing the material around the element under tension.

3. Apparatus in accordance with claim 2 in which the slitting element is positioned at an angle to the crease.

4. Apparatus in accordance with claim 2 in which the element is a hollow tube having a round, outer periphery in contact with the crease.

References Cited in the file of this patent
UNITED STATES PATENTS

| | | |
|---|---|---|
| 758,023 | Siebler | Apr. 19, 1904 |
| 1,497,895 | Donnell et al. | June 17, 1924 |
| 2,208,994 | Mabon | July 23, 1940 |
| 2,322,030 | Kressler | June 15, 1943 |
| 2,358,376 | Banigan et al. | Sept. 19, 1944 |
| 2,452,080 | Stephenson | Oct. 26, 1948 |
| 2,512,414 | Booth | June 20, 1950 |